(12) United States Patent
Eckersten et al.

(10) Patent No.: US 6,434,506 B1
(45) Date of Patent: Aug. 13, 2002

(54) PROCESS FOR DETERMINING THE RELATIVE VELOCITY BETWEEN TWO MOVING OBJECTS

(75) Inventors: Christer Eckersten, Järfalla; Lars H. Eriksson, deceased, late of Stockholm, by Gudrun Wallin Eriksson, legal representative; Stefan Felter, Sundbyberg, all of (SE)

(73) Assignee: Celsiustech Electronics AB, Järfalla (SE)

( * ) Notice: Subject to any disclaimer, the term of this patent is extended or adjusted under 35 U.S.C. 154(b) by 0 days.

(21) Appl. No.: 09/254,538

(22) PCT Filed: Sep. 16, 1997

(86) PCT No.: PCT/SE97/01559

§ 371 (c)(1),
(2), (4) Date: Jun. 11, 1999

(87) PCT Pub. No.: WO98/12574

PCT Pub. Date: Mar. 26, 1998

(30) Foreign Application Priority Data

Sep. 18, 1996 (SE) ............................................. 9603389

(51) Int. Cl.$^7$ ................................................ G06F 15/00
(52) U.S. Cl. ...................................... 702/142; 342/112
(58) Field of Search ........................... 702/142, 71, 72, 702/141, 147, 158, FOR 151, FOR 130, FOR 146; 342/112, 115, 129, 113, 88, 28

(56) References Cited

U.S. PATENT DOCUMENTS

| | | | | | |
|---|---|---|---|---|---|
| 3,737,233 | A | * | 6/1973 | Blau et al. | 356/28 |
| 3,750,170 | A | * | 7/1973 | Brown | 342/115 |
| 3,750,172 | A | * | 7/1973 | Tersselt | 342/129 |
| 4,103,302 | A | * | 7/1978 | Roeder et al. | 342/113 |
| 4,106,017 | A | * | 8/1978 | Roeder et al. | 342/88 |
| 4,620,192 | A | | 10/1986 | Collins | 342/128 |
| 4,851,851 | A | * | 7/1989 | Hame | 342/112 |
| 5,334,985 | A | | 8/1994 | Tucker et al. | 342/176 |
| 5,483,242 | A | | 1/1996 | Grein et al. | 342/111 |
| 5,563,602 | A | * | 10/1996 | Stove | 342/70 |

* cited by examiner

Primary Examiner—Marc S. Hoff
Assistant Examiner—Mohamed Charioui
(74) Attorney, Agent, or Firm—Connolly Bove Lodge & Hutz, LLP; Larry J. Hume

(57) ABSTRACT

The invention relates to a process for determining the relative velocity in the radial direction between two moving objects, using linear frequency modulation with continuous frequency sweeps. A problem in such processes lies in being clearly able. to determine the phase difference. According to the invention, a clear determination is realized by varying the period. length for successive frequency sweeps and using the difference in period length and corresponding phase change in determining the volocity.

12 Claims, 2 Drawing Sheets

PROCESS FOR DETERMINING THE RELATIVE VELOCITY BETWEEN TWO MOVING OBJECTS

BACKGROUND OF THE INVENTION

1. Field of the Invention

The present invention relates to a process for determining the relative velocity in the radial direction between two moving objects, using linear frequency modulation with continuous frequency sweeps, a transmitted signal being multiplied by a received signal for the attainment of a resultant received signal, the phase change of which over a certain time is used to determine the relative velocity.

2. Description of Related Art

A problem in determining the velocity where linear frequency modulation is used is to be able clearly to determine the phase difference. The phase change is normally only known at $\pm n \cdot 2\pi$, where n is a positive integer.

SUMMARY OF THE INVENTION

The object of the present invention is to realize a process in which the phase difference can clearly be determined. The object of the invention is achieved by a process characterized in that the period length for successive frequency sweeps is varied and in that the difference in period length and corresponding phase change is used to determine the velocity. By studying the phase change over a time period which can be made significantly shorter than the period length for a frequency sweep, the phase change can be kept within a clear interval.

The relative velocity v is advantageously calculated from the relationship:

$$v = k \cdot x / \Delta T,$$

where x is the phase difference during the time $\Delta T$ and $$k = \frac{c/2\pi}{2\alpha t_c + 2f_0}, \text{ where}$$

c denotes the velocity of the light in air, $\alpha$ denotes the gradient of the frequency sweep, $t_c$ denotes the clock time and $f_0$ denotes the carrier frequency of the signal.

The period length from a first to a second frequency sweep is changed by an amount less than or equal to the time difference which is required to be able clearly to determine the phase change on the basis of given limit values for distance apart, velocity and acceleration.

At least three successive frequency sweeps are expediently assigned a different period length.

In order to increase the accuracy in the velocity determination, the time interval during which the phase change is studied is progressively increased without any loss of clarity. An advantageous process is characterized in that phase changes, over and above for differences in period lengths, are studied for one or more period lengths and/or one or more added period lengths.

BRIEF DESCRIPTION OF THE DRAWINGS

The invention shall be described in greater detail below with reference to appended drawings, in which.

DESCRIPTION OF PREFERRED EMBODIMENTS

Firstly, an account is given below of the theory behind linear frequency modulation. The discussion then moves on to linear frequency modulation with continuous frequency sweeps, so-called "linear FMCW".

In linear frequency modulation, a signal is ideally transmitted at the frequency $f_t(t)$:

$$f_t(t) = f_0 + \alpha t, \ t \geq 0,$$

where $\alpha$ denotes the gradient of the frequency sweep and $f_0$ the carrier frequency of the signal.

For an emitted frequency sweep, the argument $\Phi(t)$ for the transmitted signal can be written:

$$\Phi(t) = 2\pi_0 \int^t f_t(\xi) d\xi = \Phi(0) + 2\pi [f_0{}^t + \tfrac{1}{2} \alpha t^2]$$

In the time domain, the transmitted signal is:

$$a(t) = a_0 \sin[\Phi(0) + 2\pi(f_0{}^t + \tfrac{1}{2}\alpha t^2)]$$

The transmitted signal is reflected and received after the time $\tau$ and can be written:

$$b(t) = b_0 \sin[\Phi(0) + 2\pi(f_0(t-\tau) + \tfrac{1}{2}\alpha(t-\tau)^2)], t \geq \tau$$

Figure 1:
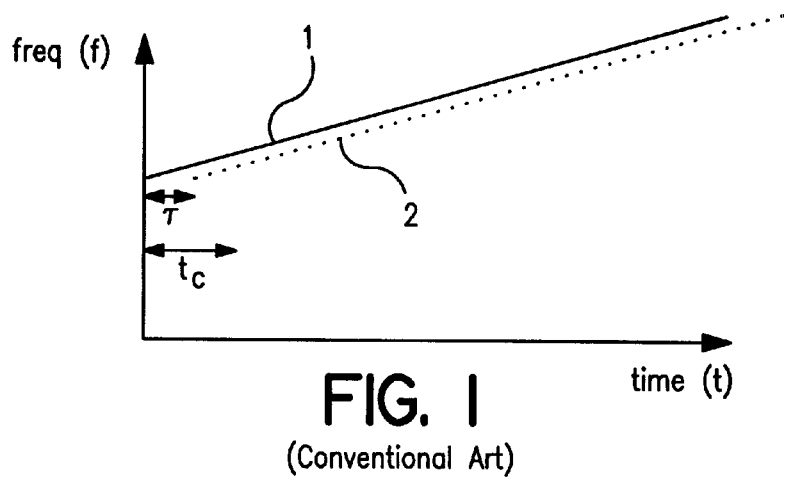
FIG. 1 shows examples of an emitted and a received signal in the case of linear frequency modulation.

The emitted signal has been denoted by 1 and the received by 2 in FIG. 1, which shows the frequency f as a function of the time t. The transit time from the transmitter to the receiver is represented by $\tau$.

If the transmitted signal and the received signal are multiplied, sorting out the high frequency sub-signal, the resulting signal will, by applying Euler's formula for exponential functions, be:

$$c(t) = c_0 \cos[2\pi(f_0\tau + \alpha t\tau - \tfrac{1}{2}\alpha\tau^2)], t > \tau$$

Figure 2:
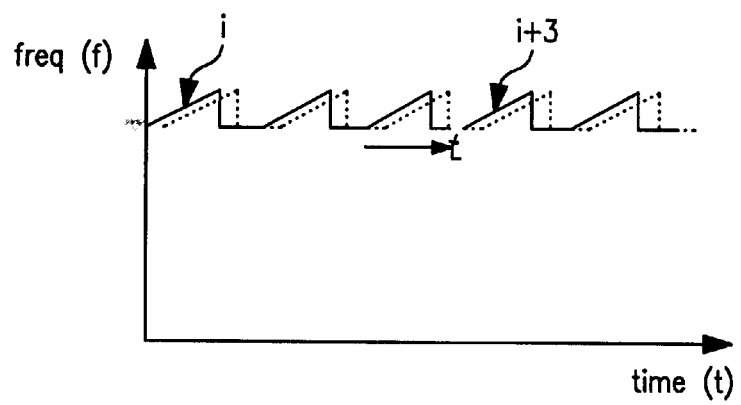
FIG. 2 shows examples of frequency sweeps of constant period length.

In the case of linear FMCW modulation, the sweep is allowed to proceed for a certain time, after which the procedure is repeated. FIG. 2 shows examples of linear FMCW modulation with frequency sweeps of constant period length. An emitted sweep is shown by an unbroken line, whilst a return sweep has been shown by a dotted line. The frequency sweeps have been numbered with the index i.

The instant of each sweep is denoted by t and is regarded as local, with t=0 for the start of each frequency sweep. The actual instant which is global is denoted by T. An object or target in the radial direction at the instant t of the frequency sweep and in respect of frequency sweep i, with the velocity v and the constant acceleration $\alpha$ parallel to the direction of the signal, is parametrized according to:

$$r(t) = r_i + vt + \tfrac{1}{2}\alpha t^2$$

$$r_i = r(0)$$

applicable where i is fixed.

This gives:

$$\tau_i + 2r_i/c + 2vt/c + \alpha t^2/c,$$

where c is the velocity of the light in the medium (air). The resultant received signal, substituted by $\tau_i$, can be written:

$$c_i(t) = c_0 \cos\left[2\pi\left[\frac{2\alpha r_i t\left(1 - \frac{2v}{c} - \frac{\alpha t}{c}\right)}{c} + \frac{f_0 t(2v + \alpha t)}{c} + \frac{2\alpha v t^2\left(1 - \frac{v}{c}\right)}{c} + \frac{2\alpha \alpha t^3\left(1 - \frac{2v}{c} - \frac{\alpha t}{2c}\right)}{c} + \frac{2r_i\left(f_0 - \frac{\alpha r_i}{c}\right)}{c}\right]\right], \quad t \geq \tau$$

The frequency for a received sweep i, $f_i$, for the resultant received signal, can be written:

$$f_i(t) = \frac{d}{dt}\left(\frac{2\alpha r_i t\left(1 - \frac{2v}{c} - \frac{\alpha t}{c}\right)}{c} + \frac{f_0 t(2v + \alpha t)}{c} + \frac{2\alpha v t^2\left(1 - \frac{v}{c}\right)}{c} + \frac{2\alpha \alpha t^3\left(1 - \frac{2v}{c} - \frac{\alpha t}{2c}\right)}{c}\right) = \frac{1}{c}\left[2\alpha r_i\left(1 - \frac{2v}{c}\right) + 2vf_0 - \left(\frac{4\alpha r_i \alpha}{c} + 2f_0 + 4\alpha v\left(1 - \frac{v}{c}\right)\right)t + 6\alpha\alpha\left(1 - \frac{2v}{c}\right)t^2 - \frac{8\alpha\alpha^2}{2c}t^3\right]$$

For small values of t, consideration being given to incorporated terms, the expression of the frequency $f_i$ can be simplified without deviating substantially from the actual frequency. The following simplified expression of the frequency can be drawn up:

$$f_i(t) = 1/c[2\alpha r_i + 2vf_0 + 4\alpha vt].$$

We further note that $(\alpha r_i/c)/f_0$ has a small value, thereby legitimately enabling the resultant received signal to be simplified to:

$$c_i(t) = c_0 \cos[2\pi[2\alpha r_i t/c + f_0 t 2v/c + 2\alpha v t^2/c + 2r_i f_0/c]], \quad t \geq \tau$$

After a certain clock time $t_c$, see FIG. 1, a first of a plurality of samples is taken of the signal. The argument $\Theta_i$ for the resultant received signal is referred to as the phase and can be written:

$$\Theta_i = 2\pi[2\alpha r_i t_c/c + f_0 t_c 2v/c + 2\alpha v t_c^2/c + 2r_i f_0/c]$$

If the phase difference between two sweeps i, j is taken, the following is obtained:

$$\Theta_j - \Theta_i = 2\pi(2\alpha t_c/c + 2f_0/c)(r_j - r_i)$$

The mean velocity between the instants $T_i$ and $T_j$ can then be expressed according to the following:

$$v = (r_j - r_i)/(T_j - T_i) = (\Theta_j - \Theta_i)i(T_j - T_i) \cdot (c/2\pi)/(2\alpha t_c + 2f_0)$$

A description is provided below of a process according to the invention, using successive frequency sweeps having different period length, reference being made to FIG. 3.

The aim is to obtain an accurate determination of the velocity v for an instant T. A good approximation of the velocity v is obtained by, according to the invention, instead determining the mean velocity over a period of time during which the velocity can be considered essentially constant on the basis of limited acceleration.

Figure 3:
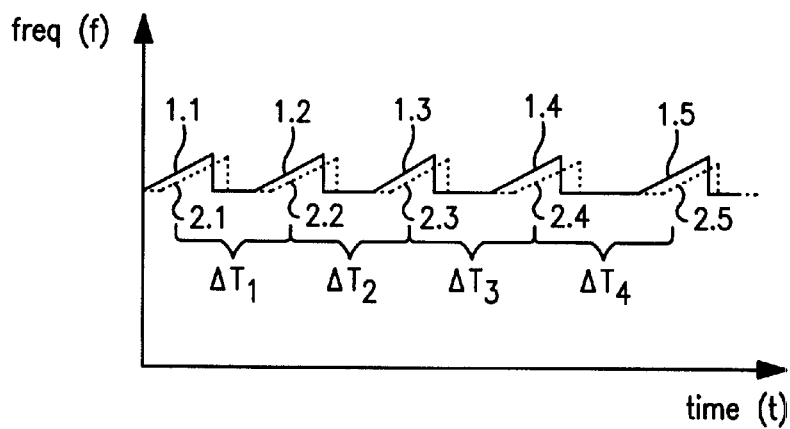
FIG. 3 shows examples of frequency sweeps according to the invention of varying period length.

FIG. 3 illustrates five emitted consecutive FMCW sweeps 1.1–1.5 having different period lengths and the associated return sweeps 2.1–2.5. For a detected object, FFT (Fast Fourier Transform) is taken for five consecutive FMCW sweeps and five adjacent bearings. For these five FFTs, a frequency slot is designated in which the absolute value in the FFT is considered greatest. For this frequency slot, the respective phase value $\Psi_i$ is also taken, which is an approximation to $\Theta_i$.

From the FFT, five phase values are obtained:

$$\Psi_1, \Psi_2, \ldots \Psi_5, -\pi \leq \Psi_i \leq \pi, 1 \leq i \leq 5$$

corresponding to the instants $$T_1, T_2, \ldots T_5$$

The phase difference between two adjacent points then becomes:

| | |
|---|---|
| $\Delta\Psi_1 = (\Psi_2 - \Psi_1)_{\text{mod } 2\pi}$ | $\Delta T_1 = T_2 - T_1$ |
| $\Delta\Psi_2 = (\Psi_3 - \Psi_2)_{\text{mod } 2\pi}$ | $\Delta T_2 = T_3 - T_2$ |
| $\Delta\Psi_3 = (\Psi_4 - \Psi_3)_{\text{mod } 2\pi}$ | $\Delta T_3 = T_4 - T_3$ |
| $\Delta\Psi_4 = (\Psi_5 - \Psi_4)_{\text{mod } 2\pi}$ | $\Delta T_4 = T_5 - T_4$ | where mod $2\pi$ denotes the modulo calculation over the interval $[-\pi, \pi]^-$.

The time differences $\Delta T_i$, $1 \leq i \leq 4$ correspond to four PRI times (Pulse Repetition Interval). The time for a FMCW sweep can be, for example, 370 $\mu$s, the smallest PRI time being able to measure about 500 $\mu$s. In order to be able clearly to determine a phase difference under prevailing conditions, a corresponding time difference of no more than about 10 $\mu$s is required. This task is managed according to the invention by using a plurality of different PRI times and then taking the difference between these. In the numerical example, the smallest difference in PRI times is 8 $\mu$s.

Any measuring errors on phase values over short time periods will have a high impact. In order to improve the precision in the velocity determination, the phase difference is measured over longer time periods, whilst, at the same time, care is taken to ensure that clarity is not lost. The PRI times are therefore chosen such that clarity is combined with good precision in the velocity determination.

According to an example, the PRI times can have the following values:

$\Delta T_1 = 512$ $\mu$s $\Delta T_2 = 520$ $\mu$s $\Delta T_3 = 544$ $\mu$s $\Delta T_4 = 640$ $\mu$s.

Inter alia, the following differences can herein be created:

| | |
|---|---|
| $\Delta\Delta T_1 = \Delta T_2 - \Delta T_1$ | 8 $\mu$s |
| $\Delta\Delta T_2 = \Delta T_3 - \Delta T_1$ | 32 $\mu$s |
| $\Delta\Delta T_3 = \Delta T_4 - \Delta T_1$ | 128 $\mu$s |
| $\Delta\Delta T_4 = \Delta T_1$ | 512 $\mu$s |
| $\Delta\Delta T_5 = \Delta T_3 + \Delta T_4$ | 1184 $\mu$s |
| $\Delta\Delta T_6 = \Delta T_1 + \Delta T_2 + \Delta T_3 + \Delta T_4$ | 2216 $\mu$s |

The following prediction ratios can be drawn up:

| | | |
|---|---|---|
| $q_1 = \Delta\Delta T_2/\Delta\Delta T_1 =$ | 4 | |
| $q_2 = \Delta\Delta T_3/\Delta\Delta T_2 =$ | 4 | |
| $q_3 = \Delta\Delta T_4/\Delta\Delta T_3 =$ | 4 | |
| $q_4 = \Delta\Delta T_5/\Delta\Delta T_4 =$ | 2.3125 | |
| $q_5 = \Delta\Delta T_6/\Delta\Delta T_5 =$ | 1.8716 ... | |

Based upon the above data, the velocity is now established by successively calculating the phase difference for the largest difference (the sum) of the PRI times. The requirement is that the first phase difference has been clearly determined. This is the case unless the velocity amount is extremely large. At each stage, firstly the phase change modulo $2\pi$, xt and then the whole phase change x is calculated according to the following:

$$x = (\Delta\Psi_2 - \Delta\Psi_1)_{mod\ 2\pi} \qquad 1.$$

$$xt = (\Delta\Psi_3 - \Delta\Psi_1)_{mod\ 2\pi} \qquad 2.$$

$$x = \text{integer}((q_1 s - xt + \pi)/2\pi) \cdot 2\pi + xt$$

$$xt = (\Delta\Psi_4 - \Delta\Psi_1)_{mod\ 2\pi} \qquad 3.$$

$$x = \text{integer}((q_2 x - xt + \pi)/2\pi) \cdot 2\pi + xt$$

$$xt = (\Delta\Psi_1) \qquad 4.$$

$$x = \text{integer}((q_3 x - xt + \pi)/2\pi) \cdot 2\pi + xt$$

$$xt = (\Delta\Psi_3 + \Delta\Psi_4)_{mod\ 2\pi} \qquad 5.$$

$$x = \text{integer}((q_4 x - xt + \pi)/2\pi) \cdot 2\pi + xt$$

$$xt = (\Delta\Psi_1 + \Delta\Psi_2 + \Psi_3 + \Psi_4)_{mod\ 2\pi} \qquad 6.$$

$$x = \text{integer}((q_5 x - xt + \pi)/2\pi) \cdot 2\pi + xt$$

where integer(.) is the integer component of (.). The velocity v is then obtained by calculating v from the relationship:

$$v = (x/\Delta\Delta T_6) \cdot \frac{c/2\pi}{2\alpha t_C + 2f_0}$$

Figure 4:
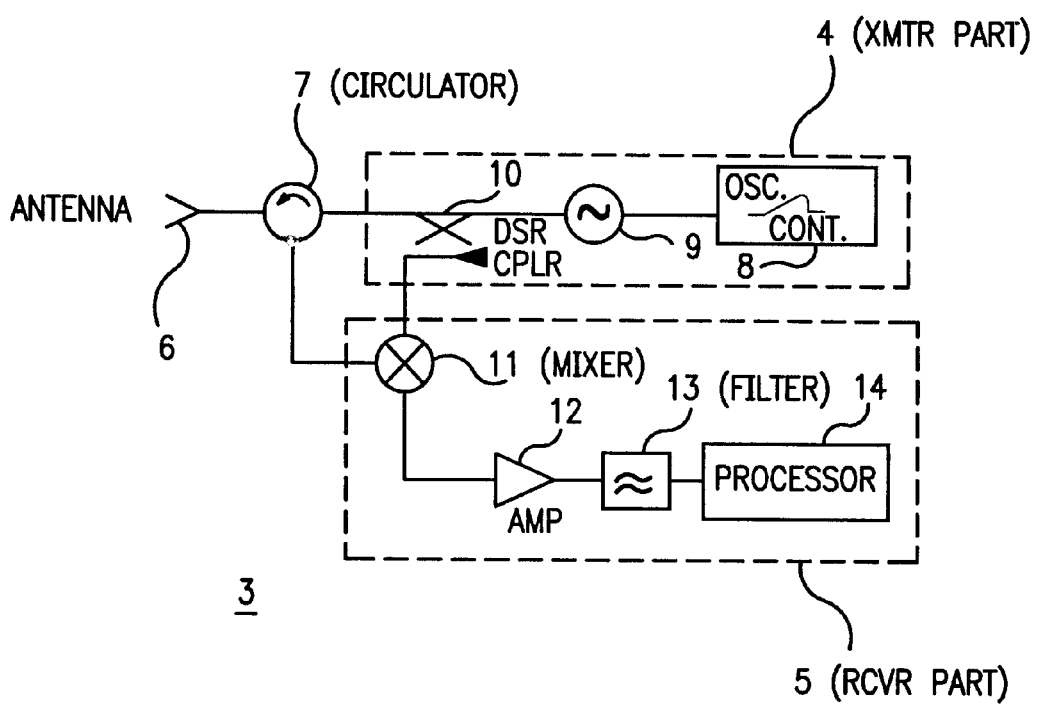
FIG. 4 shows a diagrammatic example of a FMCW radar device, which can be used in the process according to the invention.

The radar device 3 shown in FIG. 4, which can be used for realizing the process according to the invention, comprises a transmitter part 4 and a receiver part 5. An antenna 6 is connected to the transmitter part and the receiver part via a circulator 7. The transmitter part includes an oscillator control device 8 coupled to an oscillator 9 having variable frequency. Frequency sweeps from the oscillator control device 8 control the oscillator 9 such that a signal of periodically varying frequency is generated having varying period lengths for successive frequency sweeps. The generated signal is sent via a direction coupler 10 and the circulator 7 out on the antenna 6. The oscillator can operate within the Gigahertz range, e.g. 77 GHz. A reflected signal received by the antenna 6 is directed via the circulator to a mixer 11, where the reflected signal is mixed with the emitted signal. Following amplification in the amplifier 12 and filtering in the filter 13, the signal is fed to a processor block 14 in which, inter alia, determination of the relative velocity is carried out according to the process described above.

The invention shall not in any way be seen to be limited to the example above. Within the scope of the invention defined by the patent claims, there is room for a number of alternative embodiments. For example, other combinations of phase changes can be used.

What is claimed is:

1. A process for determining a relative velocity in a radial direction between two moving objects, comprising;
   using linear frequency modulation with continuous frequency sweeps,
   wherein a transmitted signal is multiplied by a received signal for the attainment of a resultant received signal,
   wherein a phase change of said resultant received signal over a time period is used to determine the relative velocity,
   wherein a plurality of period lengths associated with successive frequency sweeps are varied,
   wherein each of a plurality of succeeding period lengths is different from each of a plurality of preceding period lengths, and
   wherein a difference in at least one of the plurality of period lengths and a corresponding phase change are used to determine the relative velocity.

2. The process according to claim 1, wherein the relative velocity v is calculated from the relationship:

$$v = k \cdot x/\Delta T,$$

where x is a phase difference during a time $\Delta T$, and $$k = \frac{c/2\pi}{2\alpha t_c + 2f_0}, \text{ where}$$

c denotes the velocity of light in air, $\alpha$ denotes a gradient of the continuous frequency sweep, $t_c$ denotes a clock time, and $f_0$ denotes a carrier frequency of the signal.

3. The process according to claim 1, wherein a period length from a first to a second frequency sweep is changed by an amount less than or equal to a time difference necessary to determine a corresponding phase change based on specified values of each of a distance apart, a velocity and an acceleration.

4. The process according to claim 1, wherein at least three successive frequency sweeps are each assigned a different period length.

5. The process according to claim 1, wherein any phase changes not resulting from differences in period lengths are evaluated to determine the relative velocity using one or more period lengths.

6. A method for determining a relative velocity between two objects, comprising:
   transmitting a first linearly modulated signal having a first period length;
   receiving a first return signal reflected from one of said two objects and determining a first phase change of said first return signal over said first period length;
   transmitting a second linearly modulated signal having a second period length different from said first period length;
   receiving a second return signal from said one of said two objects and determining a second phase change of said second return signal over said second period length; and
   calculating the relative velocity using both a difference between said first period length and said second period length, and a difference between said first phase change and said second phase change.

7. The method of claim 6, wherein said first and said second frequency modulated signals are linearly modulated signals having a continuous frequency sweep.

8. The method of claim 7, wherein said calculating step includes calculating the relative velocity v from the relationship:

$$v = k \cdot x / \Delta T,$$

where x is a phase difference during a time $\Delta T$, and $$k = \frac{c/2\pi}{2\alpha t_c + 2f_0}, \quad \text{where}$$

c denotes the velocity of light in air, $\alpha$ denotes a gradient of the continuous frequency sweep, $t_c$ denotes a clock time, and $f_0$ denotes a carrier frequency of the first frequency modulated signal.

9. The method of claim 6, further comprising:

transmitting a third frequency modulated signal having a third period length different from each of the first and second period lengths; and receiving a third return signal reflected from one of said two objects and determining a third phase change of said third return signal over said third period length, wherein said calculating the relative velocity step also includes using a difference between said third period length and said second period length.

10. The method of claim 9, wherein said calculating the relative velocity step also includes using a difference between said second phase chance and said third phase change.

11. The method of claim 9, wherein said first, said second, and said third frequency modulated signals are successively transmitted.

12. A method for determining a relative velocity between two objects, comprising:

transmitting a plurality of linearly swept frequency modulated signals each having a different time period associated therewith, wherein each of the plurality of different time periods are different from each other;

determining a phase change for each of a plurality of return signals associated with said plurality of linearly swept frequency modulated signals and reflected from one of said two objects; and calculating the relative velocity between said two objects step by evaluating all phase changes not resulting from differences in an associated different time period.

* * * * *